Patented Jan. 16, 1951

2,538,431

UNITED STATES PATENT OFFICE 2,538,431

PREPARATION OF AMINOAZOBENZENES

George Shulman, West New York, N. J., assignor to Pfister Chemical Works, Inc., Ridgefield, N. J., a corporation of New Jersey No Drawing. Application January 6, 1949, Serial No. 69,630

1 Claim. (Cl. 260—205)

This invention relates to improvements in the process of manufacturing aminoazobenzene and its derivatives and salts thereof.

The general formula for the products which may be made by the process of the invention is

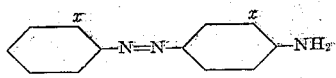

where $x$ stands for H or an alkyl or alkoxy group.

Heretofore these compounds have been made by a one stage process or a multistage process. In the one stage process, for example, sodium nitrite is added slowly to a solution of aniline in half its equivalent of hydrochloric acid. Diazotization, coupling and isomerization all take place in the one reaction mixture. This process is seldom used, however, because extremely powerful agitators are required to stir the viscous reaction mixture and the purity of the product is not good.

The multistage process, which gives a much purer product, is lengthy and requires considerable equipment. It may, for example, be conducted as follows: First, aniline is diazotized in solution in hydrochloric acid with an equivalent amount of sodium nitrite. Secondly, an acid solution of aniline is added to the diazonium compound produced by the first step and slowly coupled by the addition of alkali such as ammonia. The resultant diazoiminobenzene is isolated by filtration and then isomerized in a third step by heating with a large excess of aniline.

The process of the invention is a modification of the one stage process, which overcomes its disadvantages, the new process being characterized by the use of a monohydric alcohol containing not over three carbon atoms as a medium in which the intermediate diazoimino compound produced by diazotization is isomerized to the aminoazo compound, the process being carried out under certain essential time and temperature conditions, as hereinafter explained.

The alcohols which may be used as the medium in which the isomerization is carried out are methanol, ethanol, n-propanol and isopropanol. Under the conditions of the previously known one stage process, decomposition will take place before isomerization if the diazoimino compound is in alcoholic solution. However, it has been discovered that if the process is carried out in a period not exceeding 45 minutes from the commencement of the addition of the diazotization agent within temperature limits between 10° and 40° C., isomerization is successfully effected without decomposition and a product closely comparable in purity with that produced by the multistage process is obtained.

The starting material may be aniline or alkyl derivatives thereof such as o-toluidine (methyl aniline) or alkoxy derivatives such as o-anisidine (methoxy aniline) and o-phenetidine (ethoxy aniline), depending on the product desired.

Diazotization of the starting material is effected by usual agents, preferably sodium nitrite, other agents capable of use being potassium nitrite, nitrous acid, organic nitrites such as amyl or ethyl nitrites, and gaseous products capable of conversion to nitrous acid in water.

In practicing the invention the starting material, aniline or a derivative thereof, is mixed with one of the above-mentioned lower aliphatic monohydric alcohols and hydrochloric acid. This admixture, which becomes heated on mixing, is then cooled to about 25° to 30° C. and the sodium nitrite or other diazotizing agent is slowly added with cooling so as to keep the temperature below 40°, and preferably between 20° and 30°, while the mixture is stirred. Diazotization, coupling and isomerization all take place in the one reaction mixture, the starting material being converted to a diazonium salt which couples with excess starting material forming a diazoimino compound, which in turn isomerizes to form the basic aminoazo compound. The base may be recovered as a precipitate by dilution of the mixture with a large quantity of water or by addition of alkali, such as sodium hydroxide, or may be converted to a salt, as by addition of hydrochloric acid, and recovered as such. Removal of the final product may be effected by filtration, washing and drying and further purification effected by vacuum distillation.

The reactions which occur in forming the base may be indicated as follows:

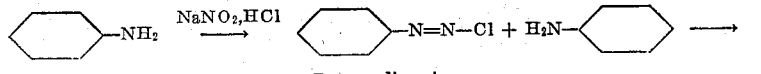

Aniline          Benzenediazonium chloride

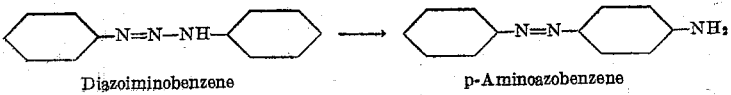

Diazoiminobenzene          p-Aminoazobenzene

Success of the process, wherein isomerization of the diazoimino to the aminoazo compound takes place in the alcohol medium, depends upon completing it rapidly and upon cooling the mixture during the reaction, which is exothermic, and in using the proper proportion of alcohol. At no time should the temperature be outside the range 10° to 40° C. and the preferred range is 20° to 30°. The time should not be more than 45 minutes at 20° to 30° and preferably the reaction time should be from 15 to 30 minutes. On a laboratory scale it is possible to cool the mixture adequately by immersing the reaction vessel in an ice water bath. On a plant scale, however, this is impossible because no external cooling means can be adequate to meet the requirements. The internal method of cooling normally used, namely the addition of ice, cannot be employed because it would completely inhibit isomerization. This cooling problem is met by the addition of solid carbon dioxide simultaneously with the sodium nitrite or other diazotizing agent and this cools the mixture without detrimental side effects.

Illustrative of how the invention may be carried out in practice are the following specific examples, Example 1 being a laboratory scale preparation and Example 2 being a plant scale operation.

Example 1

Mix 42.8 gr. ortho toluidine, 27 gr. isopropyl alcohol (63% by weight, based on the weight of the ortho toluidine) and 27 gr. hydrochloric acid (20° Bé.). The temperature rises to 50°–60° C. Cool to 25° C. and slowly sprinkle in 14 gr. sodium nitrite over a period of 30 minutes while stirring and cooling the reaction mixture in a bath of ice water to maintain the temperature between 20° and 30° C. A reddish-brown viscous oil phase forms on top of a water phase containing dissolved sodium chloride. After all of the sodium nitrite has been added, stirring is continued for five minutes and then 27 gr. hydrochloric acid (20° Bé.) is added to convert the aminoazotoluene base to the hydrochloride. The product is then filtered and the filtrate washed with dilute hydrochloric acid and dried. The yield is practically quantitative, 50 to 52 gr.

Example 2

Mix 372 lbs. aniline, 40 gal. 96% ethanol (71% by weight, based on the weight of the aniline) and 270 lbs. hydrochloric acid (22° Bé.) and cool the mixture, which has become hot, to 30° C. While agitating the mixture vigorously, 140 lbs. of powdered sodium nitrite is added continuously at a rate such that the addition is complete in from 30 to 40 minutes. At the same time, solid carbon dioxide is added to the reaction mixture at such a rate as to keep the temperature thereof between 30° and 35° C. An oily product results, as in Example 1, and this is drowned in 500 lbs. of 15% hydrochloric acid. Para aminoazobenzene hydrochloride separates in the form of very fine particles which are isolated from the liquid by filtration, washed with dilute hydrochloric acid and dried at 50° to 60° C. The yield is 450 to 460 pounds and the purity of this product is closely comparable to that produced by the more complex and time-consuming multistage process described above.

Final purification of the product may be effected by vacuum distillation.

From the foregoing examples it will be noted that the proportion of alcohol, 63% and 71% in the examples, respectively, is very much less than would normally be used for solvent purposes. This restriction in the amount of alcohol is essential to the success of the process. If a relatively large quantity of alcohol, such as is usually used for solvent purposes, is present, no isomerization will take place both in a short time and at low temperatures. Some isomerization may take place after several days at low temperature but large amounts of tar will also be formed due to decomposition. Some isomerization would take place in a short time if the solution were heated but large amounts of tar would likewise be formed. In other words, the optimum conditions for the process (low temperature and short time) cannot be realized with the use of alcohol unless the proportion of alcohol is restricted as indicated by the examples. The total amount of alcohol by weight, based on the weight of the aniline or aniline derivative, is preferably in the range 50% to 80%.

The invention thus provides a much simpler and more economical process of producing aminoazobenzene compounds of a desirable degree of purity which may be carried out with a minimum of equipment. The said compounds, produced by the process of the invention, have well known uses in the dye industry.

It is to be understood that the specific examples are to be construed as merely illustrative of the invention and not as limitations thereon, various modifications in the process being contemplated as falling within the invention as defined in the claim.

What is claimed is:

The process of making aminoazotoluene which comprises admixing a diazotizing agent with a solution of ortho toluidine in hydrochloric acid and a monohydric aliphatic alcohol containing not more than three carbon atoms in which the quantity of alcohol is in the proportion, by weight, to the ortho toluidine of from 63% to 71%, during a period of from 15 to 45 minutes, while maintaining the temperature of the reaction mixture between 10° and 40° C., and immediately separating the aminoazotoluene from said mixture.

GEORGE SHULMAN.

REFERENCES CITED

The following references are of record in the file of this patent:

UNITED STATES PATENTS

| Number | Name | Date |
| --- | --- | --- |
| 2,007,510 | Thornton | July 9, 1935 |

OTHER REFERENCES

Friswell et al.: J. C. S. Trans., v. 47 (1885), pp. 917–924.